2,792,313
Patented May 14, 1957

2,792,313

MANUFACTURE OF CELLULOSE

Frank Roland Charles and Morris Wayman, Hawkesbury, Ontario, Canada, assignors to Canadian International Paper Company, Montreal, Canada, a corporation of Quebec No Drawing. Original application April 8, 1950, Serial No. 154,896, now Patent No. 2,775,528, dated December 25, 1956. Divided and this application September 27, 1956, Serial No. 616,903

6 Claims. (Cl. 106—164)

This invention relates to new and useful improvements in the manufacture of cellulose, and especially cellulose suitable for conversion into viscose rayon, cellophane, sausage casings, cellulose derivatives such as nitrocellulose, cellulose acetate and the like, and other cellulosic products. Particularly, this invention relates to the manufacture of cellulose from wood or woody materials and has many advantages over previous wood pulps when employed to make viscose rayon. The process disclosed herein is also applicable to the processing of cotton which is to be used for similar purposes.

In the manufacture of the highest quality wood cellulose, wood is debarked and chipped, and the wood is treated at elevated temperatures and pressures with solutions of chemicals. Such chemicals are either bisulphites, usually of calcium, magnesium or ammonium and containing an excess of free $SO_2$ in solution, or are alkaline solutions of sodium hydroxide, sodium sulphide, sodium carbonate, or mixtures of these. At the conclusion of this treatment the softened chips are disintegrated into wood pulp. Such wood pulp contains small but significant proportions of lignin, tannins and other coloring matter, and organic solvent-extractable materials such as fats, fatty acids, resinous acids, sterols and hydrocarbons. The organic solvent-extractable materials are collectively termed "resin." The wood pulp produced as described above, which is mainly cellulose, is purified and bleached, and a number of processes have been described for reaching commercially acceptable levels of purity of the cellulose. As the art of purifying cellulose has improved, resulting in nearly pure cellulose with a very small content of non-cellulosic constituents, many advantages have accrued, particularly in the properties of the rayon or other derivatives manufactured from such purified cellulose. Examples of such properties are color and strength. At the same time certain difficulties have arisen in the processing of such cellulose. For example, the lowering of the resin content of rayon-grade cellulose has given rise to difficult filtration of the viscose made from it.

Simultaneously, conditions in the rayon-making industry have changed, particularly in the direction of higher speeds in various processing steps, requiring cellulose which will process more rapidly.

We have discovered that these difficulties can be overcome and a superior pulp for processing can be made by adding to the cellulose at a late stage in its manufacture one or more of the group of polyoxyethylene esters of abietic acid and hydroabietic acids. A group of compounds which we have found useful, and particularly important where yarn color is especially concerned, is the group of polyoxyethylene esters of the commercially available mixture of di- and tetra-hydroabietic acids. As far as we are aware the manufacture of this last-named group of compounds for the present purpose has been effected for the first time. These esters display remarkable stability in the viscose process, being stable under both the alkaline conditions of viscose preparation and the acid conditions of the spinning bath. This is in contrast to the behavior of fatty acid polyoxyethylene esters, which are readily attacked by alkali. The number of ethylene oxide units in the polyoxyethylene portion of these molecules can be small, merely enough to make the rosin or the mixture of di- and tetrahydroabietic acid esters soluble in water, but good results are obtained with up to 100 ethylene oxide units, and best results are obtained with 12 to 30 ethylene oxide units.

We have found that small quantities of these compounds added to the cellulose confer very marked benefits. Among advantages found in the manufacture of viscose rayon are improved steeping, less power required for shredding the alkali cellulose, more uniform adsorption of $CS_2$ in xanthation resulting in economy of $CS_2$, substantial reduction in unreacted fibre content of the viscose and therefore very much improved filtration of the viscose, considerable decrease in the amount of the spinneret incrustation, and improved rayon strength. Cellulose manufactured according to this invention also has special advantages in the manufacture of dull yarn made with suspensions of pigments and oils in the viscose since the suspensions are much more fine-grained and stable and the spinning proceeds with many fewer interruptions due to plugging or constriction of spinneret holes.

These esters can be added easily to the cellulose. It is simplest to apply them in a dilute aqueous solution to the cellulose at some stage in the drying of the cellulose sheet, preferably at a stage where the water accompanying the chemicals will be evaporated at a later stage in the drying. An aqueous solution of one of the esters, or of a mixture, may be sprayed on the cellulose sheet, or it may be applied by means of rolls. For accomplishing the objects of this invention it is not necessary to use more than 0.2% of ester on the weight of the cellulose, and usually 0.01% to 0.1% is sufficient.

The following two examples will illustrate preferred embodiments of this invention, but the invention must not be construed as limited to these examples.

*Example 1.*—A 10% aqueous solution of a polyoxyethylene ester of rosin containing 16 moles of ethylene oxide per mole of rosin was sprayed continuously all across a sheet of cellulose which was passing through a pulp-drying machine at a point where the sheet contained 50% cellulose and 50% water, at such a rate that 2 pounds of ester were sprayed on per ton of air-dry cellulose. At this rate of application all the solution was absorbed by the sheet. The sheet issuing from the drier had its normal moisture content (about 7%) and contained 0.1% ester on bone-dry cellulose. The cellulose treated in this fashion exhibited the improvements mentioned above.

*Example II.*—A 2.85% aqueous solution of mixed polyoxyethylene esters of a commercially available mixture of di- and tetrahydroabietic acids, containing an average ethylene oxide content of approximately 16.5 moles per mole of hydroabietic acid was added by means of a rotating roll to a sheet of cellulose which was passing through a pulp-drying machine. The concentration of the solution had been so adjusted that 1.4 pounds of ester per ton of bone-dry cellulose was taken up by the sheet. The point of addition in this case was where the sheet contained 60% cellulose and 40% water. The sheet issuing from the drier had its normal moisture content (about 7%) and contained 0.07% ester on bone-dry cellulose. The cellulose treated in this fashion exhibited the following improvements in processing into 1650 denier 720 filament high strength viscose rayon tire yarn, spinning at 100 metres per minute:

|  | Treated Wood Pulp | Untreated Wood Pulp |
|---|---|---|
| Shredding of Alkali Cellulose: | | |
| Percent Retained on ¼″ mesh screen after 1½ hours shredding. | 2% | 4%. |
| Nature of alkali cellulose crumb. | Soft, fluffy and reactive. | Rather hard in feel. |
| Viscose Filtration: | | |
| Weight in grams filtered through ¼″ diameter disc of Canton Flannel before filter plugged. | 154 | 124. |
| Spinning Behavior: | | |
| Number of breaks per spindle in 48 hours. | 3 | 6. |
| Number of spinnerettes changed in 48 hours. | 0 | 2. |
| Spinneret behavior | All holes still clean after 24 hours' spinning. | A few slow holes per spinneret after 24 hours' spinning. |
| Rayon Strength: | | |
| Grams per denier, bone-dry | 4.01 | 3.88. |
| Percent Elongation, bone-dry | 16.6 | 16.0. |
| Grams per denier, conditioned | 3.40 | 3.24. |
| Percent Elongation, conditioned | 20.2 | 19.8. |
| Grams per denier, wet | 2.04 | 1.95. |
| Percent Elongation, wet | 23.6 | 22.4. |

Many variations on this process will suggest themselves to those skilled in the art, but such variations are considered as falling within the scope of the invention, provided the compounds employed are within the class named.

The ester may be added at any stage up to and including the viscose itself, but with diminishing benefits. This will be obvious from our disclosure since addition to the viscose, for example, cannot give improved steeping or any of the other benefits derived in the manufacturing of the viscose. However, addition even to the viscose itself confers the substantial advantages of improved dispersion and stability of pigments and oils, and better spinning with fewer breaks, less spinneret incrustation, more first grade yarn and higher rayon strength.

We claim:
1. In the manufacture of regenerated cellulose products by the viscose process, the step of incorporating into viscose polyoxyethylene esters derived from the group consisting of abietic and hydroabietic acids wherein the number of ethylene oxide units in the polyoxyethylene portions of the molecules of said esters are from 12 to 100, said esters being added in an amount from 0.01% to 0.2% based on the weight of the cellulose content of the viscose.

2. In the manufacture of regenerated cellulose products by the viscose process, the step of incorporating into viscose polyoxyethylene esters of a mixture of di- and tetra-hydroabietic acids, wherein the number of ethylene oxide units in the polyoxyethylene portions of the molecules of said esters are from 12 to 100, said esters being added in an amount from 0.01% to 0.2% based on the weight of the cellulose content of the viscose.

3. Viscose having incorporated therein a polyoxyethylene ester derived from the group consisting of abietic and hydroabietic acids.

4. Viscose having incorporated therein from 0.01% to 0.2%, based on the weight of cellulose in the viscose, of a polyoxyethylene ester derived from the group consisting of abietic and hydroabietic acids and wherein the number of ethylene oxide units in the polyoxyethylene portions of the molecules is from 12 to 100.

5. In the manufacture of regenerated cellulose products by the viscose process, the step of spinning viscose in the presence of a polyoxyethylene ester derived from the group consisting of abietic and hydroabietic acids.

6. In the manufacture of regenerated cellulose products by the viscose process, the step of spinning viscose in the presence of from 0.01% to 0.2%, based on the weight of cellulose in the viscose, of a polyoxyethylene ester derived from the group consisting of abietic and hydroabietic acids and wherein the number of ethylene oxide units in the polyoxyethylene portions of the molecules is from 12 to 100.

No references cited.